July 12, 1960

F. A. ZIHERL ET AL
PORTABLE ANESTHESIA MACHINE, OXYGEN
INHALATOR AND RESUSCITATOR 2,944,547

Filed Dec. 9, 1955

INVENTORS
FRANK A. ZIHERL
ARTHUR S. KISH
BY ROBERT A. HINGSON

ATTORNEYS

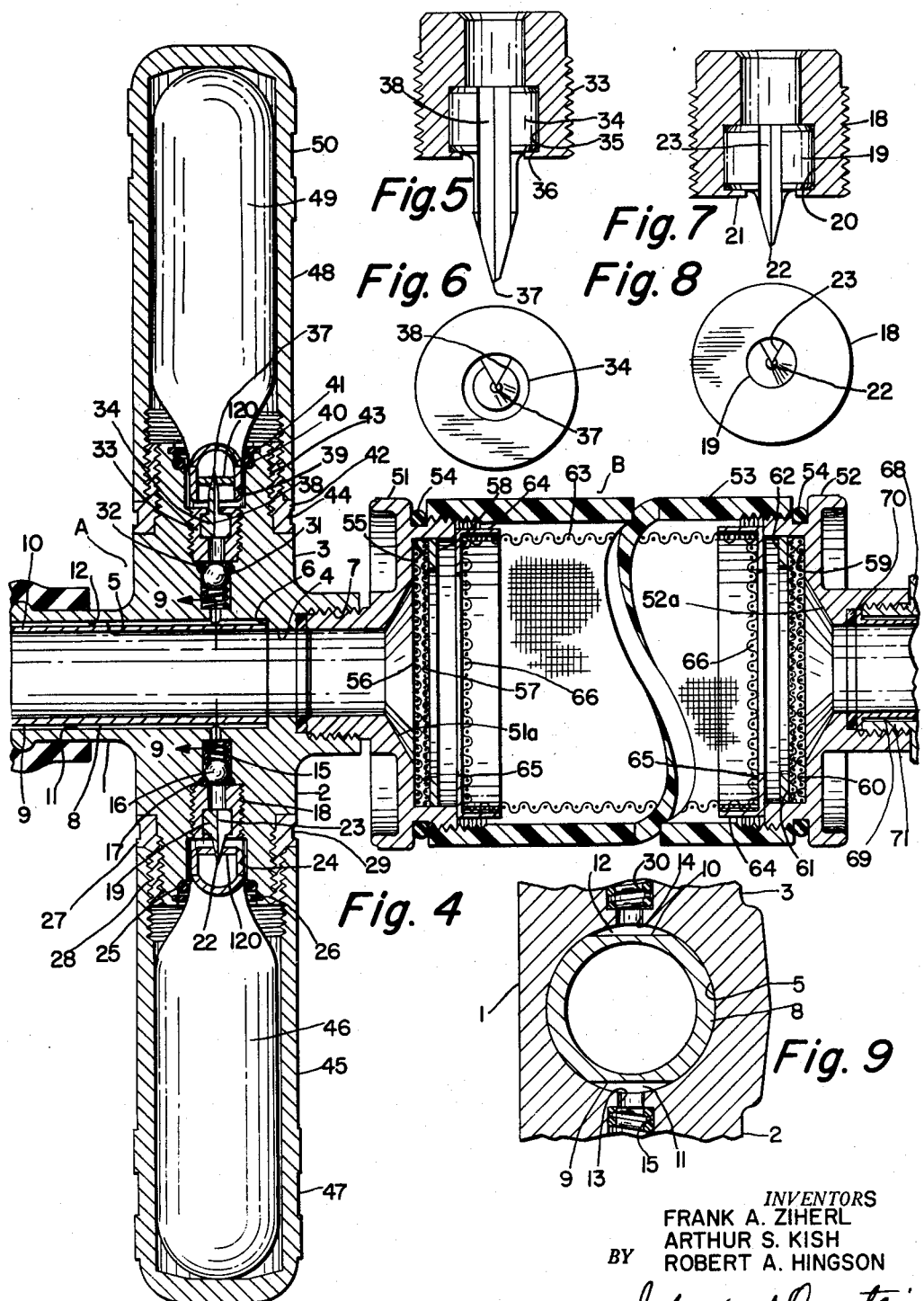

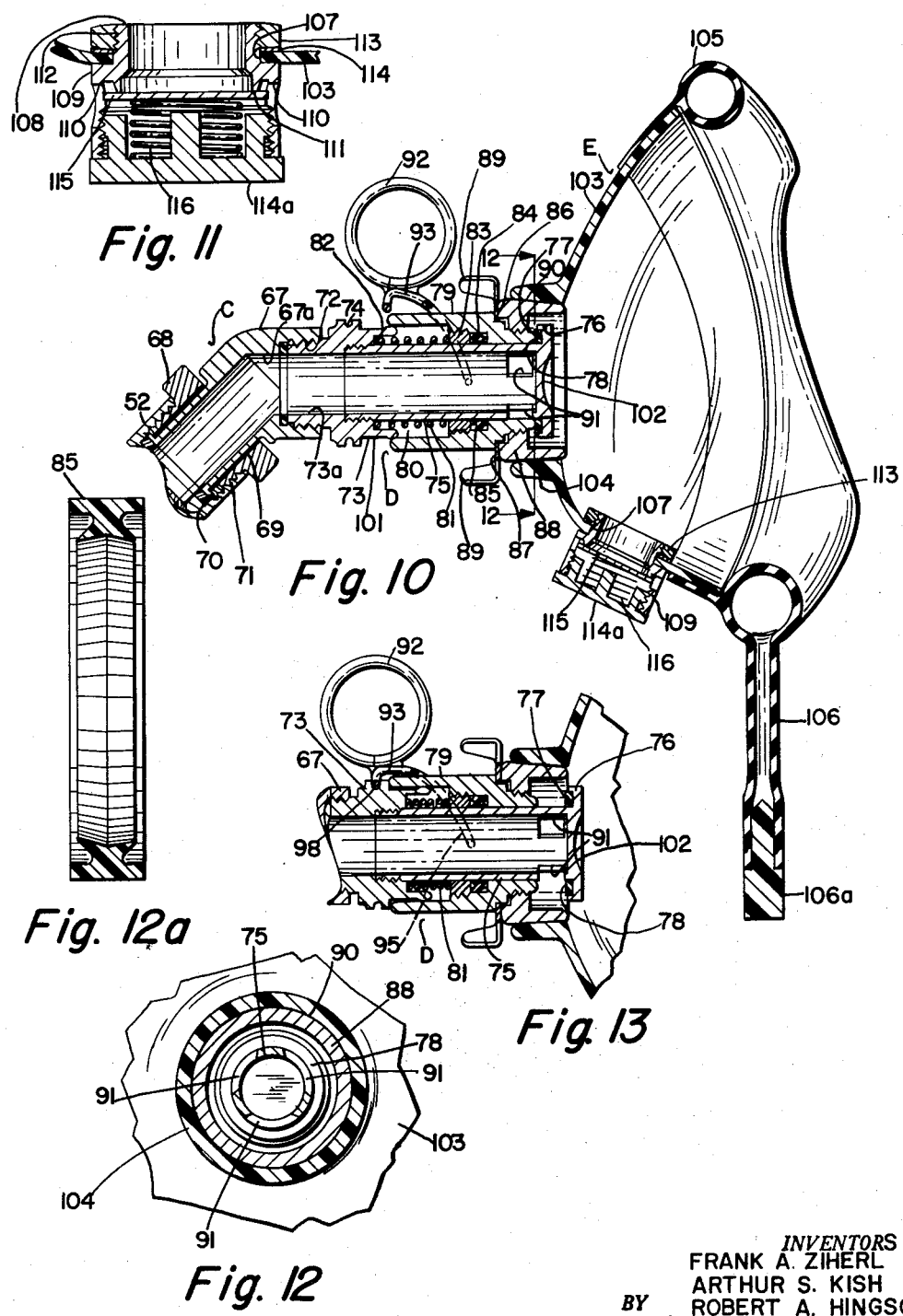

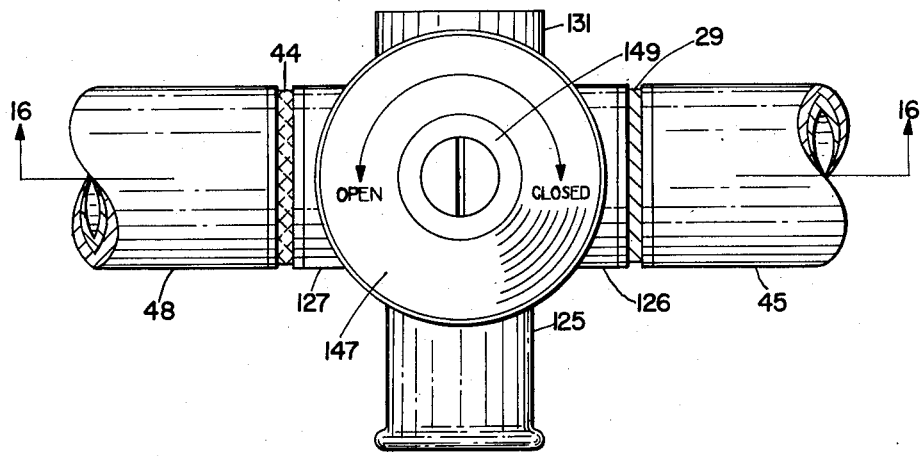
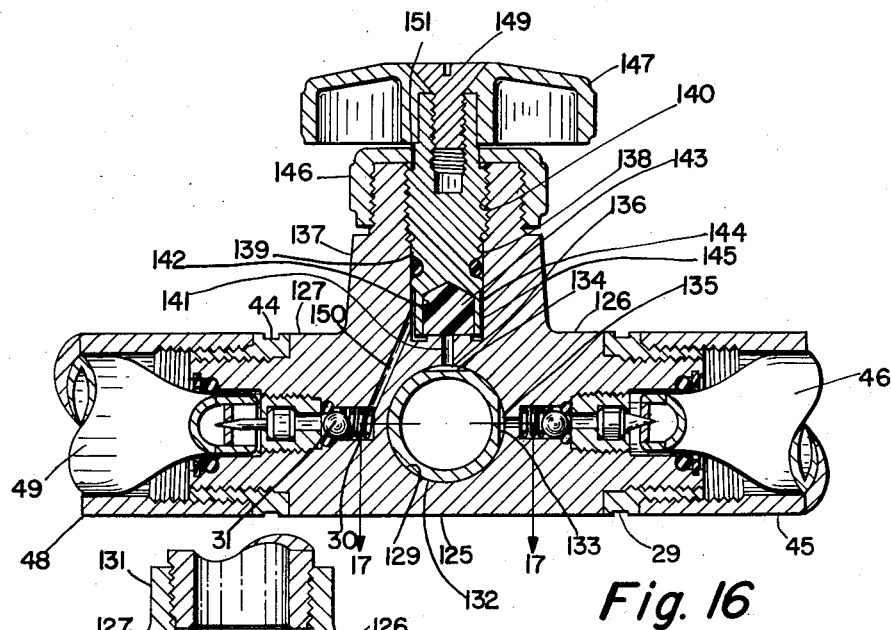
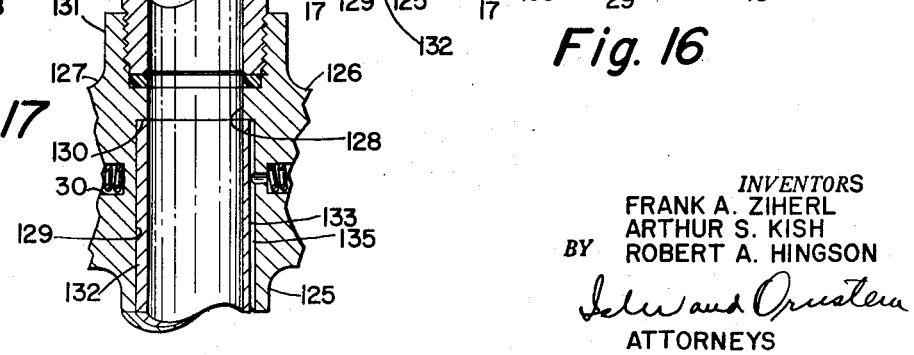

United States Patent Office 2,944,547
Patented July 12, 1960

2,944,547

PORTABLE ANESTHESIA MACHINE, OXYGEN INHALATOR AND RESUSCITATOR

Frank A. Ziherl, Cleveland, Arthur S. Kish, Lyndhurst, and Robert A. Hingson, Cleveland Heights, Ohio, assignors to Z and W Machine Products, Inc., Wickliffe, Ohio, a corporation of Ohio Filed Dec. 9, 1955, Ser. No. 552,070

15 Claims. (Cl. 128—203)

This invention relates generally to a portable anesthesia machine, oxygen inhalator and resuscitator, but has reference more particularly to improvements in the portable respirator disclosed in our copending application, Serial No. 451,906, filed August 24, 1954.

A primary object of the invention is to provide a machine of the character described, through the use of which non-explosive mixtures of gases can be easily, safely and effectively administered to a patient for anesthesia purposes.

Another object of the invention is to provide, in convenient, easily handled form, pre-packaged containers of gases, under pressure, such as cyclopropane, helium and oxygen, whereby non-explosive mixtures of these gases can be quickly prepared for use in anesthesia procedures.

Another object of the invention is to provide a machine of the character described, in which means have been incorporated for preventing simultaneous use of an excessive number of cyclopropane containers in the machine, to the exclusion of oxygen and other gases required in anesthesia procedures.

A further object of the invention is to provide a machine of the character described, in which improved means have been provided fo visually aiding the anesthetist or other user of the machine in properly placing or inserting the various gas containers in the machine.

A further object of the invention is to provide a machine of the character described, which has incorporated therein carbon-dioxide absorbent means of improved construction and having improved facility for use.

A further object of the invention is to provide a machine of the character described, in which a facial mask is utilized of improved construction, and having incorporated therein pressure relief means of novel construction.

A still further object of the invention is to provide a machine of the character described, in which means are provided for visually indicating to the anesthetist that the anesthesia mixture is entering the facial mask.

A still further object of the invention is to provide, in a machine of the character described, a novel metering valve mechanism which permits the administration of serially titrated doses of cyclopropane at will, for prolonging anesthesia in some cases.

Other objects and advantages of our invention will be apparent during the course of the following description.

In the accompanying drawings forming a part of this specification and in which like numerals are employed to designate like parts throughout the same, Fig. 1 is a top plan view of the machine;

Fig. 4 is a fragmentary cross-sectional view, on an enlarged scale, taken on the line 4—4 of Fig. 2;

Fig. 5 is a view, partly in section, and partly in elevation, and in greatly enlarged scale, of the needle assembly for perforating the cyclopropane containing cylinders;

Fig. 6 is a front elevational view of the needle assembly of Fig. 5;

Fig. 7 is a view similar to Fig. 5, but showing the needle assembly for perforating the oxygen containing cylinders;

Fig. 8 is a front elevational view of the needle assembly of Fig. 7;

Fig. 9 is a fragmentary cross-sectional view, taken on the line 9—9 of Fig. 4;

Fig. 10 is a fragmentary cross-sectional view, approximately full-size scale, taken on the line 10—10 of Fig. 1, but showing the gas inlet ports to the face mask in closed position;

Fig. 11 is a cross-sectional view, on an enlarged scale, showing the pressure relief valve of the face mask;

Fig. 12 is a fragmentary cross-sectional view, taken on the line 12—12 of Fig. 10;

Fig. 12a is a cross-sectional view of a special seal which is used in the slide-valve assembly;

Fig. 13 is a view similar to Fig. 10, but showing the gas inlet ports to the face mask in open position, as in Figs. 1 and 2;

Fig. 16 is a cross-sectional view, taken on the line 16—16 of Fig. 15; and

Fig. 17 is a fragmentary cross-sectional view, taken on the line 17—17 of Fig. 16.

Figure 1:
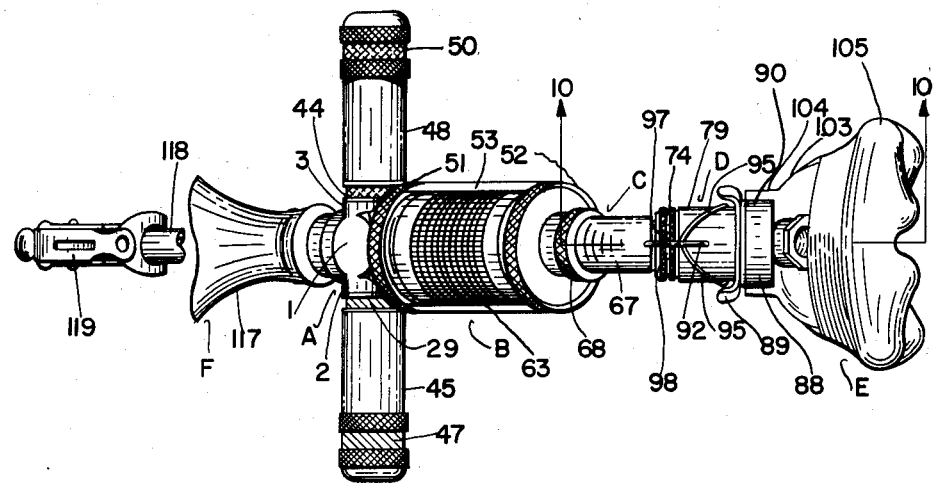
Fig. 1 is a top plan view, on an enlarged scale, of an optionally usable metering valve which permits the administration of titrated doses of cyclopropane.

Referring more particularly to Figs. 1 to 13 inclusive of the drawings, the apparatus will be seen to comprise a central axial body assembly, a soda-lime canister assembly, an elbow fitting assembly, a slide valve assembly, a face mask assembly, and a rebreather bag, these units being generally designated by reference letters A, B, C, D, E and F, respectively. Each of these units will now be described in detail.

*Central axial body assembly*

The central axial body assembly A comprises a central body member 1 having laterally-extending branches 2 and 3. The body member 1 has an axial passageway 4 therein, which is counterbored as at 5 to provide a shoulder 6, and is also counterbored at its forward end to provide a threaded socket 7.

Secured within the counterbore 5, as by a press fit, and with one end thereof in abutment witht the shoulder 6, is a baffle 8, made of a short length of tubing having diametrically opposite sides thereof provided with flats 9 and 10, which coact with the wall of the counterbore 5 to provide passageways 11 and 12 which serve a purpose to be hereinafter described.

The body member 1 is provided with spaced openings 13 and 14, which are in axial alignment with the branches 2 and 3. The opening 13 communicates with the passageway 11, and the opening 14 with the passageway 12. The opening 13 is counterbored, as at 15, for the reception of a spring-pressed ball 16, which is seated against an O ring 17, secured in position by means of a member 18 which is threadedly secured in the branch 2 of the body member 1. The member 18 is part of a needle sub-assembly, which comprises the member 18 and a needle 19 which is press-fitted into an axial opening 20 in the member 18 and is staked securely thereto by means of a flange 21 (Fig. 7). The needle 19 is provided with a piercing point 22, and with a channel or passageway 23 extending through the needle, and formed by removing from the needle a sector extending through an arc of about 60 degrees. The passageway 24 in which the member 18 is mounted has mounted in the wall thereof adjacent its outer end an O ring 25, which serves a purpose to be presently described, and is locked against axial displacement by means of a washer 26. It will be noted that the end of the point 22 of the needle 19 is at a point just beyond the outer end of the member 18, for a purpose to be presently disclosed.

The branch 2 is exteriorly threaded for the connection thereto of a bushing 27, which is exteriorly threaded as at 28, and is provided with a band 29 of green color, for a purpose to be presently described.

The opening 14 is also counterbored, as at 30, for the reception of a spring-pressed ball 31, which is seated against an O ring 32, secured in position by means of a member 33 which is threadedly secured in the branch 3 of the body member 1. The member 33 is part of a needle sub-assembly which comprises the member 33 and a needle 34 which is press-fitted in an axial opening 35 in the member 33 and is staked securely thereto by means of a flange 36 (Fig. 5). The needle 34 is provided with a piercing point 37, and with a channel or passageway 38 extending through the needle, and formed by removing from the needle a sector extending through an arc of about 60 degrees. The passageway 39 in which the member 33 is mounted has mounted in the wall thereof adjacent its outer end an O ring 40, which serves a purpose to be presently disclosed, and is locked against axial displacement by means of a washer 41. It will be noted that the end of the point 37 of the needle 34 is at a point considerably beyond the outer end of the member 33, in contradistinction to the location of the end of the point 22 with respect to the member 18. The reason for this will be explained presently.

The branch 3 is exteriorly threaded for the connection thereto of a bushing 42, which is exteriorly threaded as at 43, and is provided with a band 44 of orange color, for a purpose to be presently disclosed.

Threadedly secured to the bushing 27 is a side-arm or container 45 which is made hollow so as to receive a cylinder 46 containing a gas under pressure. The side-arm 45 is provided with a band 47 of a green color corresponding to that of the band 29, as an aid in insuring that the side-arm 45 will be connected to the bushing 27 when the side-arm and its cylinder 46 are connected to the body assembly.

Threadedly secured to the bushing 42 is a side-arm 48 which is similar to the side-arm 45, and is adapted to receive a cylinder 49 containing a gas under pressure. The side-arm 48 is provided with a band 50 of an orange color corresponding to that of the band 44, as an aid in insuring that the side-arm will be connected to the bushing 42 when the side-arm and its cylinder 49 are connected to the body assembly.

Soda-lime canister assembly

The soda-lime canister assembly B comprises a cap 51 which is threadedly secured into the socket 7 of the body member 1, a cap 52, and a cylinder 53 which is interposed between the caps 51 and 52 and is threadedly secured to the latter. O rings 54 are interposed between the caps and the ends of the cylinder to avoid leakage at these points.

The cap 51 is provided with an annular ledge or seat 55 against which a screen 56 of 18 mesh stainless steel wire is disposed, a second screen 57 of much finer mesh (105 mesh) stainless steel wire being disposed against the inner face of the screen 56. The screens 56 and 57 are retained in place by means of a washer 58, which is frictionally fitted in the cap 51. The cap 52 is similarly provided with an annular ledge or seat 59 against which a screen 60 of 18 mesh stainless steel is disposed, a second screen 61 of much finer mesh (105) stainless steel wire being disposed against the inner face of the screen 60. The screens 60 and 61 are retained in place by means of a washer 62 which is frictionally fitted within the cap 52.

The fine mesh screens 57 and 61 are designed to prevent passage of foreign particles into the patient, but are so flexible as to be distortable through handling. This distortion is, however, prevented by the use of the coarser mesh screens 56 and 60, which bear against the fine mesh screens to resist any such distortion.

The aforesaid assembly is adapted for the reception of a canister which consists of a cylindrical screen 63, to the open ends of which collars 64 are frictionally fitted, these collars having flanges 65 which serve to hold circular screens 66 against the ends of the screen 63 to close the ends of the latter. The screens 63 and 66 are made of 18 mesh stainless steel wire, and the collars 64 and screens 66 are removable from the screen 63, so as to permit the canister to be filled with soda-lime.

When the canister, filled with soda-lime, is inserted into the cylinder 53, and the caps 51 and 52 are secured to the cylinder, the ends of the canister are in electrical contact with the caps. The caps 51 and 52 are of electrically conductive material, such as aluminum, so that an electro-conductive path is established through the canister and end caps, to prevent spark effects.

It will be noted that the inner faces of the end caps 51 and 52 are tapered as at 51a and 52a respectively. This permits a larger area of the screens to function as filters and reduces to a minimum the resistance to the flow of the gases.

The soda-lime canister assembly, including the soda-lime contents thereof, interposes a minimum of resistance to the flow of the gases to and from the face mask. In actual practice, this resistance does not usually exceed a pressure of 1 mm. of mercury.

Elbow fitting assembly

The elbow fitting assembly C is designed to permit use of the machine at any desired angle or position, and comprises an elbow fitting 67, and a nut 68 which is connected to an extension 69 of the fitting 67, and is secured against displacement from the extension 69 of the fitting by means of a flange 70. The nut 68 is rotatable about the extension 69, and is provided with a threaded extension 71 adapted for connection to the cap 52, so that when the nut is secured to the cap 52, the fitting 67 may be rotated to any desired position. The fitting 67 is internally threaded, as at 72, for the connection thereto of the slide-valve assembly, to be now described.

Slide valve assembly

The slide valve assembly D comprises a connector 73 which is threadedly secured to the fitting 67 of the elbow fitting assembly, and is provided with an annular groove 74 in its outer surface, and an axial passageway 73a which is in alignment with the passageway 67a in the fitting 67.

Threadedly secured within the forward end of the connector 73 is a tubular element or valve stem 75, having an annular flange 76 at its forward end, the rear face of this flange having an annular recess 77 within which a sealing ring 78 of synthetic rubber, such as neoprene, is frictionally secured.

Mounted for limited slidable reciprocal movement along the outer face of the valve stem 75 is a sleeve 79, having a rear portion which overhangs the forward end of the connector 73 and forms with the outer face of the valve stem 75 an annular chamber 80, within which a compression coil spring 81 is disposed. The rear end of the spring 81 abuts the shoulder 82 of the connector 73, while the forward end of this spring abuts a packing follower 83, which is threadedly secured within the sleeve 72, in spaced relation to a shoulder 84 of the sleeve. A seal or sealing ring 85 is disposed about the valve stem 75, in the space between the follower 83 and the shoulder 84. The sealing ring 85 is preferably made of polyethylene and is of a special cross-section, as shown in Fig. 12a, designed to effectively seal against leakage of gases between the valve stem 75 and the sleeve 79.

The sleeve 79 is provided with an annular shoulder or ledge 86 to which a hook ring 87 is clamped, as by means of a collar 88 which is threadedly secured to the sleeve. This hook ring 87 is provided with four hooks 89, which are adapted for connection to head straps (not shown) which may be used for securing the apparatus to the head of a patient.

The collar 88 is provided with an outer surface 90, which, as shown in Fig. 10, is tapered inwardly from left to right, for a purpose to be presently described.

The action of the spring 81 is to normally force the forward end of the sleeve 79 against the sealing ring 78, as shown in Fig. 10.

The valve stem 75 is also provided at circumferentially spaced points adjacent its closed forward end, with openings 91, which are normally closed by the sleeve 79, due to the action of the spring 81.

For the purpose of pulling the sleeve 79 rearwardly against the action of the spring 81, so as to uncover the openings 91, a spring clip is provided, which includes a ring 92 disposed directly above the rear portion of the sleeve 79. Secured to the lower portion of this ring 92 is a pair of wire elements 93 (Fig. 10) and 94 (Fig. 2) bent at their forward ends to provide arcuate portions 95 which embrace the sleeve 79 and terminate in stub shafts 96 which are pivotally connected to the sleeve 79 at diametrically opposite sides thereof, as shown in Fig. 3, and are bent at their rear ends to provide arcuate portions 97 and 98 which partially encircle the connector 73.

When it is desired to uncover the openings 91, the ring 92 is grasped and pulled rearwardly until the portions 97 and 98 of the wire elements 93 and 94 are opposite the groove 74 in the connector 73, after which the portions 97 and 98 are entered into the groove, thereby locking the sleeve 79 in a position in which the openings 91 are uncovered, as shown in Fig. 13.

Upon lifting the portions 97 and 98 of the spring clip out of the groove 74, the spring 81 functions to automatically close the openings 91.

Grooves 99 and 100 (Figs. 2 and 3) are provided in the outer wall of the sleeve 79, into which the portions 95 of the wire elements 93 and 94 are adapted to snap, for the purpose of latching the spring clip in its locking and releasing positions.

For the purpose of providing the anesthetist or other user of the machine with a visual indication as to whether the openings are covered or uncovered, the connector 73 is provided with a band 101 of red color (see Fig. 10), this band being completely visible when the openings 91 are covered, but being completely covered up or concealed from view when the sleeve 79 has been moved to its rearmost position and the opening 91 completely uncovered.

In order to facilitate removal of the valve stem 75 from the connector 73, to permit replacement of the sealing ring 85 when worn, or for any other purpose, the closed end of the valve stem 75 is provided with a slot 102, which enables a coin to be used for unscrewing the valve stem from the connector.

Face mask assembly

The face mask assembly E comprises a hollow mask body 103 which is contoured to fit over the mouth and nose of a patient, and is preferably molded of a transparent plastic. This body is provided with an inlet collar 104, the interior surface of which is tapered to correspond to the taper of the surface 90 of the collar 88, so that the body can be removably attached to the collar 88 by what is termed as a "wringe" fit. Such a fit, which produces a wedging action between the parts is effective to maintain the parts in tightly sealed relationship during use of the machine, yet permits the face mask assembly to be quickly and easily disengaged from the machine, for the purpose of permitting masks of other sizes and types and other connectors to be fitted to the machine.

The body 103 has frictionally secured to its periphery an inflatable face-engaging cuff or seal 105 of soft rubber, from which a tube 106 extends. The tube 106 is provided with a closure plug 106a, the seal 105 being inflatable by means of air supplied through the tube 106.

The body 103 is also provided in its lower portion with a circular opening 107, in which a relief valve assembly is secured. This relief valve assembly comprises a valve 108 consisting of an annular body 109 having a series of circumferentially-spaced openings 110, an annular valve seat 111 spaced radially-inwardly from the body 109, and a threaded extension 112, which extends through the opening 107, so that the valve may be secured to the mask body 103 by means of a nut 113 which is secured to the extension and is disposed adjacent the inner face of the mask body, a washer 114 of brass being interposed between the nut 113 and inner face of the mask body to provide a seal at this point.

The relief valve assembly also includes a plug 114a which is threadedly secured to the valve 108, and a disk seal 115, of brass or like material, which is normally maintained on the seat 111 by means of a compression coil spring 116, which is interposed between the seal and plug.

The relief valve is designed to open under a pressure of 20 mm. of mercury, within the mask, to thereby limit the build-up of excessive or dangerous pressures within the mask.

Rebreather bag

Figure 2:
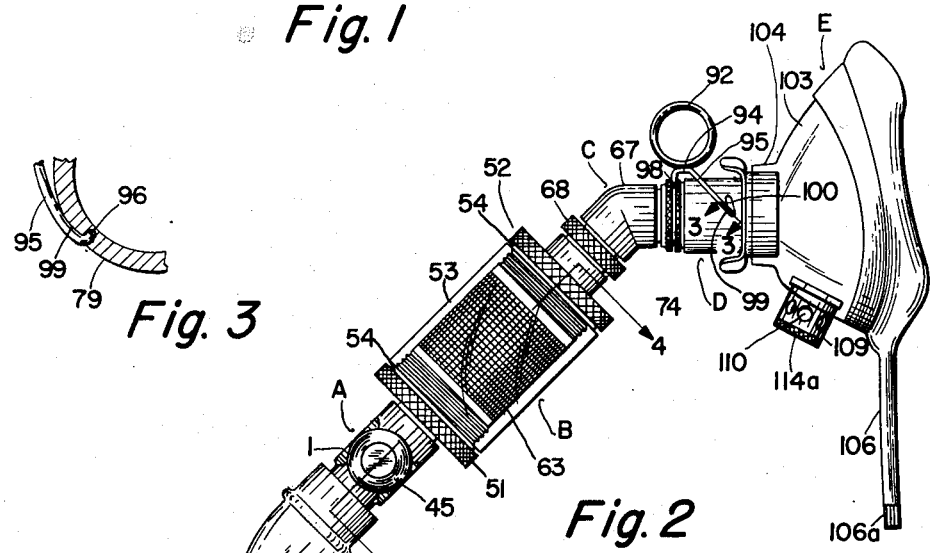
Fig. 2 is a side elevational view of the machine.
Figure 3:
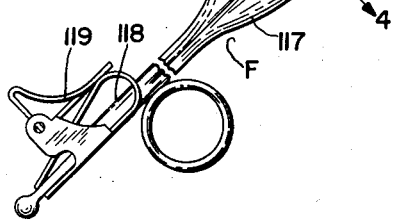
Fig. 3 is a fragmentary cross-sectional view, on an enlarged scale, taken on the line 3—3 of Fig. 2.

Secured to the rear end of the body member 1, of the central axial body assembly A, is a rebreather bag 117 of soft rubber or the like, constituting a storage tank or receptacle for the various gases, or mixtures thereof, as will be presently explained, this bag, when not in use, being fully deflated as shown in Figs 1 and 2.

The bag 117, which preferably has a capacity of 6½ to 7 liters of gas, is provided at its rear end with a tubular extension 118, which is normally maintained closed by means of a conventional snap clamp 119. This clamp may be opened to permit the admission, when desired, of oxygen into the bag through the extension 118, as from a wall connector or reservoir.

Use of machine

The cylinders 46 and 49, to which reference has previously been made are similar to cylinders or cartridges which are presently in general use for the storage of carbon dioxide. In such cylinders the gas is stored under pressure and therefore, it is possible to store a relatively large volume of gas in a limited space. For the particular purposes for which the present machine is designed, such for example, as anesthesia purposes, the cylinders may contain the following gases under pressure.

CYLINDER 46

| Exterior Identification | Contents |
|---|---|
| Green with Brown Stripe | 1,650 cc. Oxygen. |

CYLINDER 49

| Exterior Identification | Contents |
|---|---|
| Orange with Brown Stripe | 2,200 cc. Cyclopropane. 1,180 cc. Helium. |

The foregoing "contents" represent the actual free volume of these gases under standard conditions of temperature and pressure, which have been compressed or stored in the cylinders.

Although precise figures are given for the cubic contents of the cylinders, it will be understood that these are subject to variation, the important consideration being that the cylinders provide a mixture of gases, which, for reasons to be presently explained, will consist of about 30% cyclopropane, about 30% oxygen, and about 40% helium.

In the use of the machine for anesthetic purposes, the anesthetist will insert one of the cylinders 46 in the side-arm 45, and one of the cylinders 49 in the side-arm 48. The possibility of inserting the cylinders in the wrong side-arm is partially obviated by the green coloring on the cylinder 46 which aids in insuring that this cylinder will go into the side-arm which bears the green band 47 and by the orange coloring on the cylinder 49 which aids in insuring that the cylinder 49 will go into the side-arm which bears the orange band 50.

He will then attach the side-arm 45 to the bushing 27 and the side-arm 48 to the bushing 42, taking the precaution of not screwing the side-arms onto the bushings sufficiently to cause the points of the needles which have been described to pierce the closures or stoppers of the cylinders. In this connection, it may be noted that the cylinders have similar neck portions of reduced diameter, and have closure or stoppers 120 of soft metal in their necks, which can be pierced by the piercing points of the needles, but that the closure 120 of the cylinder 46 is disposed virtually at the end of the neck of this cylinder, whereas the closure 120 of the cylinder 49 is disposed at a point spaced a considerable distance inwardly from the end of the neck of the cylinder 49. The reason for this will be explained presently.

The anesthetist will then take the precaution of insuring that the sleeve 79 is so positioned that the openings 91 are covered by the sleeve, so that no gas can escape into the mask before the machine is ready for use, and will also see that the extension 118 of the bag 117 is closed, so that no gas can inadvertently escape from the bag.

Having observed these precautions, he will screw the side-arm 45 inwardly with one hand while holding the machine by means of the side-arm 48, to thereby release the contents of the cylinder 46 into the bag. As the side-arm 45 is screwed inwardly, the neck of the cylinder 46 slides through the O ring 25, and the closure is pierced by the piercing point 22, releasing the oxygen-helium mixture from this cylinder, and permitting the mixture to pass through the passageway 23 in the needle 19.

As the mixture of gases pass through the passageway 23, the ball 16 is lifted from its seat 17 against the pressure of the spring, and passes through the space between the ball 16 and the wall of the counterbore 15, the passageway 13 and into the bag 117. When the contents of the cylinder 46 have been released, the ball 16 is automatically seated, thereby preventing leakage of gas from the bag.

After the oxygen-helium mixture has been released into the bag, the cyclopropane-helium mixture is similarly admitted into the bag 117 by holding the side-arm 45 and screwing the side-arm 48 inwardly, this mixture passing through the passageway 38 of the needle 34, the space between the ball 31 and wall of the counterbore 30, the passageway 12, and into the bag 117.

The difference in the lengths of the needles 19 and 34 is designed to prevent the inadvertent fitting of two cylinders of the cyclopropane-helium mixture into the machine simultaneously, to the exclusion of the oxygen-helium mixture. Thus, should the anesthetist attempt to insert two of the cylinders 49 containing the cyclopropane-helium mixture, into the machine, the closure 120 of the cylinder 49 is disposed at such a distance inwardly from the end of the neck of the cylinder that even if the side-arm 45 is screwed onto the bushing 27 to its maximum extent, the closure will not be pierced by the needle 19, and it will therefore be impossible to discharge the contents of one of the cylinders into the rebreathing bag. It is, however, possible to use two of the cylinders 46 in resuscitative maneuvers, to the presently explained, but only one of the cylinders 49 at one time in any anesthetic induction.

When the bag 117 has been filled with the cyclopropane-helium-oxygen mixture, which is ready to be administered to the patient, the anesthetist, by means of the side-arms 45 and 48, places the mask against the face of the patient, adjusting the mask until it is properly fitted. He then uncovers the openings 91 by grasping the ring 92 and pulling it rearwardly until the portions 97 and 98 of the wire elements 93 and 94 are opposite the groove 74 in the connector 73, and then enters the portions 97 and 98 into the groove, thereby locking the sleeve 79 in a position in which the openings 91 are uncovered.

Upon lifting the portions 97 and 98 of the spring clip out of the groove 74, the spring 81 functions to automatically close the openings 91, thus holding the remaining gas in the machine and rebreathing bag in reserve.

The canister to which reference has been made is provided for the purpose of absorbing carbon dioxide, and by making the cylinder 53 of a transparent plastic, a color change of the soda lime from pink to yellow may be obsedved, to inform the anesthetist when the soda lime must be replaced with fresh soda lime. The provision of a separate canister for containing the soda lime enables such a replacement to be made quickly and easily.

It may be noted that the cylinders are of such size that under normal conditions of anesthesia administration, no harm can result to a patient even if the entire contents of the cylinders are administered to the patient. This is in contrast to usual anesthetic administration in which large bulky cylinders of gas are used, which, if accidentally left open, could result in a lethal dose being given to a patient.

The use of such small cylinders for the gases has another distinct advantage in that it greatly reduces explosion or fire hazards, since even if one or both cylinders exploded, it would cause less harm to a patient, and less damage to the operating room or hospital than in the usual methods. This is also in direct contrast to the use of large reservoir cylinders in the usual method, which, on exploding, have been known to kill not only the patient and others in the immediate vicinity, but to actually blow out walls of rooms or the hospital.

From a practical standpoint, substantially all of the parts of the machine, with the exception of the rubber parts, are preferably made of aluminum, containing no paint or grease which might accentuate the explosion factor. The soda lime canister forms a stainless steel screen grid bridge through the canister assembly, thereby reducing the possibility of forming electrostatic spark gaps. The rebreathing bag, and head strap for connecting the mask to the patient's head are made of electrically conductive rubber.

Uses in anesthesia

Basic rules to be followed in using the machine for anesthesia purposes are as follows:

(a) It is recommended that no physician or dentist who is untrained in the management of the airway of the unconscious patient should use the machine.

(b) It is also recommended that only properly trained personnel who thoroughly understand the pharmacology, preparation of the patient, technic of administration of cylclopropane, and the treatment of complications resulting from its uses, should use this machine in anesthesia.

(c) The machine should not be used in anesthesia in areas without available suction, mechanical or pharyngeal airways and instruments for visual intubation.

(d) When using cyclopropane, a filled oxygen-helium cylinder must be released into the rebreathing bag after each four to six minutes of use to meet the adult patient's basic oxygen requirements.

Induction of anesthesia

The green and brown cylinder (oxygen and helium) should be placed in the side-arm with the green band and the contents emptied into the rebreathing bag.

Only after the bag is at least half filled by the foregoing maneuver, should the orange and brown cylinder (cyclopropane and helium) be released from the side-arm with the orange band into the bag, thus filling the 6½ to 7 liter bag with a mixture containing 2200 cc. cyclopropane, 1650 cc. oxygen and 1650 cc. helium (40% cyclopropane, 30% oxygen and 30% helium).

This mixture will produce a loss of consciousness in the adult or the child within 4 to 8 breaths. Surgical anesthesia at about plane 2 or 3 is provided in from 15 to 20 breaths.

With a snug fit of the mask, this mixture is safe for inhalation for a period of 4 to 6 minutes for adults, and longer for children.

The anesthesia may be prolonged beyond this period by adding additional cylinders of oxygen and helium to the mixture each four minutes.

One cylinder of cyclopropane and helium and four cylinders of oxygen and helium is sufficient for anesthesia for 10 to 20 minutes.

Should additional cyclopropane be required, it may be added to the mixture when so required, by means of a cyclopropane-helium cylinder.

Non-explosive features

In a summary of the problem of explosions related to anesthesia, presented by Curtis B. Hickcox, in his chapter in Hale's "Anesthesiology by 40 American Authors," pages 706 through 724, published in 1955 by F. A. Davis Company, of Philadelphia, a chart is shown on page 712, showing the explosibility of cyclopropane, oxygen and helium mixtures, and on the basis of this chart, a mixture containing, by volume, 30% cyclopropane, 30% oxygen, and 40% helium, is proposed as a nonflammable mixture which offers the most promise for anesthetic uses.

The use of the present machine and the cylinders developed therefor provide a packaged non-explosive mixture which admirably fulfils the aforesaid promise. The non-explosibility of the mixtures was verified by placing them in an explosion chamber, and testing them for inflammable character by means of electric spark and flame ignition. The absence of explosions in these tests confirmed the data referred to in the aforesaid chapter of Hale's book.

In our testing of the explosibility of these mixtures, more than 2000 quantitative and qualitiative gas measurements by the chemical method from 529 individual samplings before and during 75 random anesthetics were completed in patients of varying sizes, weights and physical condition, for various surgical, obstetrical and dental procedures. More than 96 percent of these samplings remained outside of both the spark and flame ignition ranges.

Figure 14:
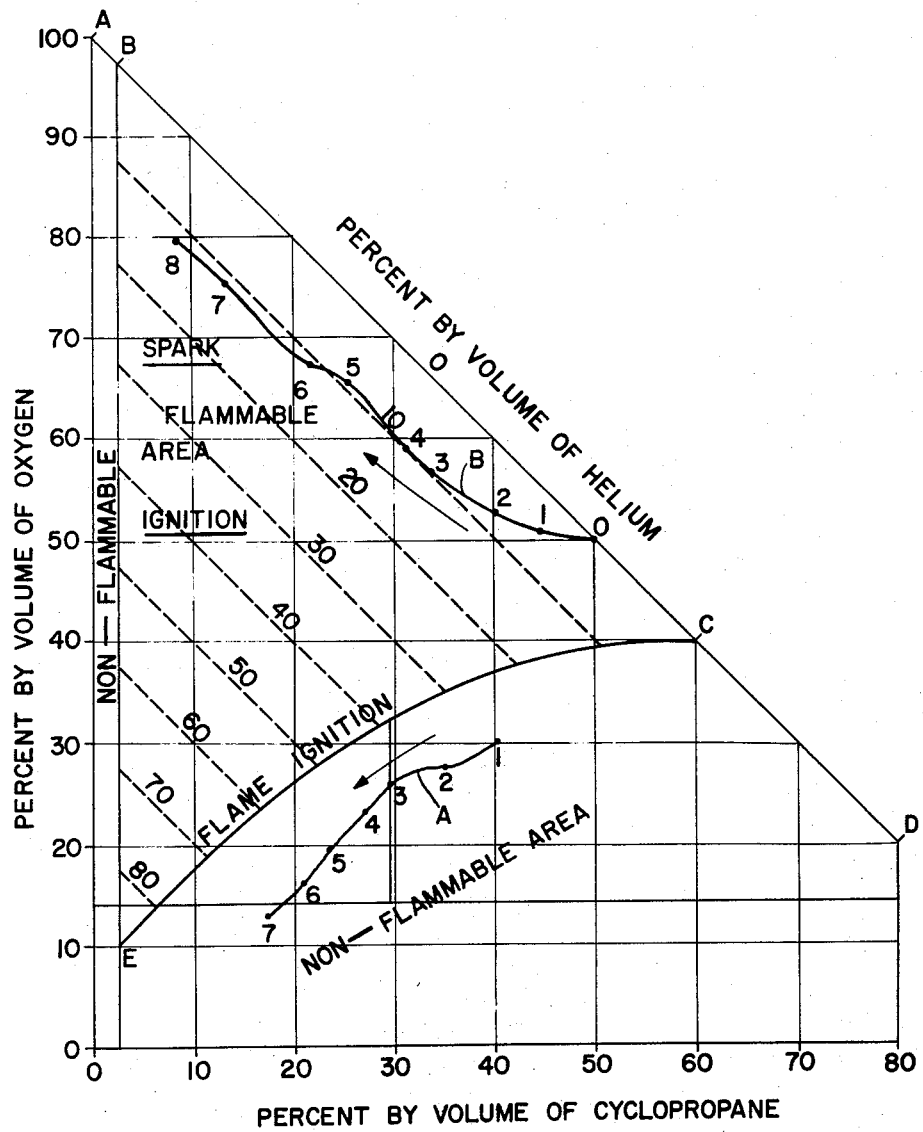
Fig. 14 is a graph illustrating the non-explosive and non-inflammable nature of anesthesia gases administered through use of the machine.

In Fig. 14, the curve A represents samplings of gases from a typical adult patient who remained in the non-inflammable area for 7 minutes of anesthesia. It may be noted in the graph that the oxygen concentration approached the low level of 16% at the end of the first 6 minutes of the procedure. Each sample indicates the average gas percentages after such ten respirations from a predetermined non-explosive mixture during 7 minutes of anesthesia.

In contrast to the curve A, the curve B in Fig. 14 represents samplings of gases from a patient who remained in the explosive range for eight minutes, through a typical anesthesia with cyclopropane and oxygen, using standard or conventional equipment.

Use as an inhalator

The machine is also adaptable for use as an inhalator by patients on prescription, and others in hypoxic atmospheres, and particularly for persons having an asthmatic condition, cardiac disease, anemia, respiratory diseases, as well as those who have aspirated foreign objects, and persons suffering from the effects of high altitudes.

For this purpose, a cylinder, similar to the cylinder 46, and containing a total free volume of 3000 cc. of oxygen under standard conditions of temperature and pressure, stored therein, may be used, or, as an alternative, oxygen may be supplied from a tank or wall reservoir through a flow meter set at 300 to 600 cc. per minute.

When a cylinder containing the compressed oxygen is used, the cylinder is colored green over its entire surface, in accordance with accepted medical standards, so that it may be readily identified, as to its contents, by the user of the machine.

In using such a cylinder, the snap clamp is first applied to the terminal port of the rebreathing bag, to close such port. Two of these cylinders are then applied to the central axial body of the machine, at the branches 2 and 3, and the side-arms screwed on to release the contents of the cylinders into the rebreathing bag. Two of the cylinders will inflate a 6-liter rebreathing bag, and, providing there is no leakage around the face mask, this is sufficient oxygen for approximately 20 to 25 minutes of inhalation.

When oxygen is supplied from a tank or wall reservoir, it may be introduced into the bag through the extension of the bag by opening the snap clamp and attaching the flow meter to the terminal port of the bag by means of a glass connector and rubber tubing.

The canister filled with 100 cc. of fresh Baralyme or Soda Lime is adequate to maintain the carbon dioxide levels below 2 percent by volume for 15 to 20 minutes.

In using the machine as an inhalator, care must be taken to insure that the patient's air tract is maintained clear of foreign bodies, regurgitated fluid, blood and mucus. The head strap is then placed under the patient's head, the rubber mask seal is moistened to insure good contact with the patient's face, and the mask is placed on the patient's face.

The openings 91 to the interior of the mask are then opened by holding the central axial body and exerting a slight downward pressure against the mask until the red band 101 is completely covered or concealed from view, whereupon the sleeve 79 is locked in position by means of the spring clip, as previously described. The mask is then secured on the patient's face with the head strap.

The machine is so constructed that with the two open cylinders of oxygen, the rebreather bag is just under filled. This will not develop positive pressure in the face mask. As long as the 6½ to 7 liter rebreather bag contains 500 to 1000 cc. of gas mixture, it is not possible to develop any negative pressure.

Firemen and rescue squads and aviators may use the machine as an inhalator by self-administration of 100% oxygen, as described in the preceding paragraph.

Cardiac patients, asthmatics and smoke asphyxiated victims might inhale oxygen under the direct supervision of experienced personnel or may be trained to administer therapeutic inhalation of oxygen and helium upon a doctor's prescription and instruction, at home, in transit or at high altitude.

Use as a rescuscitator

The relief valve 108 is, as described, a pressure limiting valve, which automatically releases when positive pressure within the mask equal to 20 mm. of mercury is applied.

A normal full hand squeeze on the rebreathing bag exerts no more than 15 mm. mercury pressure.

In resuscitation, pure oxygen, or oxygen and helium may be used, by repetitive refilling from the green sidearm container.

In the non-breathing patient, while protruding and lifting the lower jaw with one hand, the bag is squeezed rhythmically with the other hand, being squeezed slowly for one second, and then released to allow one second for exhalation, with a pause of one second thereafter before repeating the cycle. The procedure comprises 12 to 20 complete cycles per minute.

The foregoing procedure provides an effective means of artificial respiration, giving visual evidence of good chest expansion and deflation during each respiratory cycle. If the patient's air tract is unsatisfactorily maintained by this maneuver, the sleeve 79 should be released to close the openings or ports 91, the mask removed, and a soft rubber oral pharyngeal airway should be inserted in proper position, the mask reapplied, and the resuscitation procedure resumed.

As use in this procedure deflates the rebreathing bag, more oxygen can be provided by replacing the empty cylinders. Experience indicates that oxygen should be added before the bag is completely deflated.

The soda lime canister should be replenished approximately every 15 to 20 minutes of use in prolonged cases of resuscitation.

In using the machine as a resuscitator, the following points may be noted:

(a) The machine does not develop negative pressures.

(b) The face mask relief valve, as already stated, will not allow positive pressure throughout the machine to exceed 20 mm. of mercury.

(c) The mean mask pressure will be constant, due to the pause after each hand squeeze cycle.

(d) Operating pressure will be from 0 to 20 mm. of mercury. Positive pressures below 20 mm. of mercury will be controlled by the hand motion of the physician or rescue personnel, and pressures, exceeding 20 mm. of mercury are controlled by the relief valve.

(e) The machine is a closed system, in which the patient or victim rebreathes the gas in the rebreather bag.

*Optional metering procedure*

For the purpose of administering serially titrated doses of cyclopropane at will, in certain cases where prolonged anesthesia is desired, a central axial body assembly having a novel metering valve, is used in place of the previously-described central axial body assembly, as shown in Figs. 15, 16 and 17.

The central axial body assembly, in this case, comprises a central body member 125 having laterally-extending branches 126 and 127. The body member 125 has an axial passageway 128 therein, which is counterbored as at 129 to provide a shoulder 130, and is also counterbored at its forward end to provide a threaded socket 131.

Secured within the counterbore 129, as by a press fit, and with one end thereof in abutment with the shoulder 130, is a baffle 132, made of a short length of tubing having its external surface provided with flats 133 and 134, which are disposed ninety degrees circumferentially from each other, and which coact with the wall of the counterbore 129 to provide passageways 135 and 136 which serve a purpose to be presently described.

The body member 125 is provided with an upstanding branch 137 having an axial bore 138, in which a valve stem 139 is mounted, the stem being threaded to the branch 137, as at 140, to permit movement of the stem in the bore. The lower end of the bore 138 communicates with the passageway 136, through a passageway 141 of small diameter, and the lower end of the stem 139 is provided with a socket or recess 142 in which a plug seal 143, preferably made of plastic, is mounted, this seal being adapted, by movement of the stem 139, to close the entrance to the passageway 141.

The lower portion 144 of the stem 139 is of a diameter slightly less than that of the wall of the bore 138, thereby providing an annular chamber 145 between it and the wall of the bore.

The valve stem 139 is retained against axial displacement from the branch 137 by means of a cap 146 which is threaded to the upper end of the branch 137. The stem 139 extends through this cap, and is provided at its upper end with a knob 147, for rotating the stem to open and close the valve. This knob 147 is secured to the stem by means of a screw 149.

The cylinder perforating mechanism in the body member 125 is identical with that of the previously described central axial body assembly, except that in this case, the bore 30, in which the spring-pressed ball 31 is mounted, does not extend inwardly to the wall of the bore 129, but terminates short of the latter, and a passageway 150 interconnects the inner end of the bore 30 with the annular chamber 145.

The valve stem 139 may thus be raised to admit the cyclopropane-helium mixture to the rebreathing bag, by way of the bore 30, passageway 150, chamber 145, bore 138, passageway 141 and passageway 136.

The stem 139 is raised to its maximum extent by a slight turn of the knob 147, a shoulder 151 on the valve stem coming into abutment with the cap 146 to limit such movement. In other words, the valve is opened and closed by rotation of the knob 147 through a few degrees only. In this way, serially titrated doses of cyclopropane may be administered to the patient at will, and under closely controlled conditions.

Since the use of the meter valve mechanism is an alternate technique, it will be used by anesthesiologists conversant with the minute-volume requirements of cyclopropane to achieve the necessary patient relaxation. It is not necessary to use this alternate technique, at all, for short operations.

The machine can be used most advantageously with balanced anesthesia in which there is proper premedication, supplemented with intravenous anesthesia and/or conduction nerve block anesthesia.

However, the machine, used alone, is sufficient in a wide variety of other operations, such as dental extractions, inductions for all pediatric anesthesias, setting of simple fractures, myringotomies, incision of abscesses, obstetrical deliveries, supplement to nerve block and spinal anesthesia, control of hemorrhage and removal of foreign bodies on battlefield, removal of surgical packs and sutures, change of burn dressings, and prolonged anesthetics (with the meter valve technique).

The machine is provided with two sizes of face masks, an adult style or size, as described, and a somewhat smaller size or style for children. The child's mask is similar in all respects to that of the adult, but is somewhat smaller in dimensions. However, the size of the inlet collar 104 and the taper of the interior surface of this collar, in the child's style, are identical with those of the adult size or style, so that the adult and child's face mask may be interchangeably fitted to the machine.

A still smaller mask may be used for infants, as well as other types of masks, such as dog masks, nasal masks, etc., all of which are designed to be interchangeably fitted to the machine.

It will also be noted that the connections of the various parts are of the same size, so as to permit omission of some of the parts and interconnection of the remaining parts with each other. For example, the soda-lime canister assembly may be omitted, and the elbow assembly connected directly to the central axial body, or both the soda-lime canister assembly and the elbow assembly omitted, and the slide valve assembly directly connected to the central axial body, or the elbow assembly omitted and the slide valve assembly directly connected to the soda-lime canister assembly.

By modifying the body members of the central axial body assembly, two or more of these may be connected to each other, in tandem, so as to permit the use of plural sets of gas cylinders in a single machine.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In a machine of the character described, a hollow body member having an outlet branch, hollow side-arms secured to said body member and containing gases under pressure, a tubular element in communication with said outlet branch, said element having outlet openings, a sleeve normally closing said openings, a mask, and means securing said mask to said sleeve, said means comprising a collar having a tapered surface, said mask having a collar with a correspondingly tapered surface, whereby said mask may be removably secured to said first-named collar by a wringe fit.

2. In a machine of the character described, a hollow bod member having an outlet branch, hollow side-arms secured to said body member and movable in relation to said body member, cylinders containing gases under pressure disposed within said side-arms, said cylinders having puncturable closures, puncturing means disposed within said body member and responsive to movement of said side-arms toward said body member to puncture said closures whereby to release said gases for passage into said body member, and spring-pressed valves adjacent said puncturing means but immovable by said puncturing means, said valves adapted to be opened by the pressure of said gases when released and to be closed when contents of the cylinders have been released.

3. In a machine of the character described, a hollow body member having an outlet branch, a pair of hollow side-arms secured to said body member and movable in relation to said body member, cylinders disposed within said side-arms, one of said cylinders containing an anesthetic gas under pressure, and the other of said cylinders containing oxygen under pressure, said cylinders having puncturable closures, puncturing means within said body member and responsive to movement of said side-arms toward said body member to puncture said closures, whereby to release said gases for passage into said body member, one of said puncturing means being of a length insufficient to puncture the closure of the anesthetic gas cylinder irrespective of the extent of movement of the side-arm containing said cylinder, whereby to preclude the simultaneous opening of two anesthetic gas cylinders in the event of inadvertent placing of two such cylinders in the machine to the exclusion of an oxygen cylinder.

4. A machine, as defined in claim 3, in which each cylinder is provided with a reduced neck portion, and the closures of the cylinders are disposed in said neck portions, the closure of the anesthetic gas cylinder being disposed at a greater distance from the end of the neck of said cylinder than is the closure of the other cylinder.

5. In a machine of the character described, the combination of a hollow body member having an outlet, a face mask in spaced relation to said outlet, means for passing gases from said outlet and into said mask, and means interposed between said outlet and mask for absorbing carbon dioxide, said last-named means comprising a cylinder, end caps for said cylinder, and screens disposed adjacent both ends of said cylinder, a canister containing a carbon-dioxide absorbent, said canister disposed within said cylinder, said screens being of extremely fine mesh, whereby to preclude passage of said absorbent from said canister through said end caps.

6. A machine, as defined in claim 5, in which said screens are so thin as to be easily distortable, and additional screens are provided adjacent said first-named screens, said additional screens supporting said first-named screens against distortion.

7. A machine, as defined in claim 5, in which said canister comprises a cylindrical body having perforations therein, and having end closures through which gases may pass.

8. A machine, as defined in claim 7, in which said canister is removable bodily from said first-named cylinder, whereby to permit replacement by another canister.

9. In a machine of the character described, a hollow body member having an outlet, a mask in spaced relation to said outlet, and means interconnecting said body member with said mask, said means including an elbow fitting comprising a body portion of elbow conformation and a nut swiveled to the exterior of one branch of said elbow, said body portion being rotatable relatively to said nut, whereby to permit circumferential adjustment of said mask relatively to said outlet.

10. A machine, as defined in claim 9, in which means are provided for maintaining said nut against axial displacement from said branch of said elbow.

11. In a machine of the character described, a central axial body assembly comprising a central body member having an axial passageway, said body member having axially-aligned branches disposed perpendicularly to the axis of said passageway, said branches adapted for the passage of gases under pressure, said body member having a third branch disposed perpendicularly to said axial passageway and to said axially-aligned branches, and means within said third branch including a metering device for admitting gases in minute quantities from one of said axially-aligned branches into said passageway, said metering device comprising a valve stem, and a knob for rotating said stem to move it axially.

12. A machine, as defined in claim 11, in which said metering device includes a bore in said third branch, and said stem has a portion of reduced diameter which coacts with the wall of said bore to provide an annular chamber for receiving said gas.

13. In a machine of the character described, a body assembly comprising a central body member having laterally-extending branches for the passage of gases, and having an axial bore therein disposed perpendicularly to said branches, a cylindrical baffle disposed within said bore and having a flat coacting with the wall of said bore to provide a passageway for gases from one of said branches, said body member having an upstanding branch perpendicular to said laterally-extending branches and bore, said upstanding branch having an axial bore communicating with the first axial bore through a passageway of small diameter in said body member, a valve stem mounted in said second axial bore and movable to close said passageway of small diameter, and passageways communicating the other of said laterally-extending branches with said second axial bore, said baffle having a second flat in a plane of the first flat, and coacting with the wall of the first axial bore to provide a passageway communicating with said passageway of small diameter.

14. In a machine of the character described, a hollow body member having an outlet, a mask in spaced relation to said outlet, and means interconnecting said body member with said mask, said means including an elbow fitting comprising a body portion of elbow conformation, one branch of which has a smooth cylindrical outer surface, and a nut swiveled to said outer surface, said nut being externally threaded, said body portion being rotatable relatively to said nut, whereby to permit circumferential adjustment of said outlet.

15. A machine, as defined in claim 14, in which said branch has a flange for maintaining said nut against axial displacement from said branch.

(References on following page)

References Cited in the file of this patent

UNITED STATES PATENTS

| | | |
|---|---|---|
| Re. 17,512 | McKesson | Dec. 3, 1929 |
| 1,203,391 | O'Donnell | Oct. 31, 1916 |
| 1,821,996 | Willson | Sept. 8, 1931 |
| 2,168,695 | Asari | Aug. 8, 1939 |
| 2,295,296 | Schmidt | Sept. 8, 1942 |
| 2,310,021 | Heidbrink | Feb. 2, 1943 |
| 2,348,074 | Lambertson | May 2, 1944 |
| 2,348,277 | Boothby | May 9, 1944 |
| 2,652,828 | Matheson | Sept. 22, 1953 |

FOREIGN PATENTS

| | | |
|---|---|---|
| 871,698 | France | Jan. 19, 1942 |
| 107,990 | Great Britain | July 26, 1917 |